US006911246B2

United States Patent
Choi et al.

(10) Patent No.: US 6,911,246 B2
(45) Date of Patent: Jun. 28, 2005

(54) RUBBING APPARATUS HAVING TURNING BUFFER FOR FABRICATING LIQUID CRYSTAL DISPLAY DEVICE

(75) Inventors: Joung-Won Choi, Pusan-kwangyokshi (KR); Jin-Suk Kang, Inchon-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 201 days.

(21) Appl. No.: 10/331,771

(22) Filed: Dec. 31, 2002

(65) Prior Publication Data

US 2003/0179332 A1 Sep. 25, 2003

(30) Foreign Application Priority Data

Mar. 25, 2002 (KR) .............................. P10-2002-0015968

(51) Int. Cl.$^7$ ........................ B32B 3/06; G02F 1/1337
(52) U.S. Cl. ........................ 428/101; 349/123; 349/126
(58) Field of Search ............................... 349/123, 126, 349/187; 428/101; 51/298

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,221,981 A | * 6/1993 | Kodera et al. | 349/126 |
| 5,247,377 A | 9/1993 | Omeis et al. | |
| 5,263,888 A | 11/1993 | Ishihara et al. | |
| 5,379,139 A | 1/1995 | Sato et al. | |
| 5,406,397 A | * 4/1995 | Kodera et al. | 349/126 |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |

(Continued)

FOREIGN PATENT DOCUMENTS

| | | |
|---|---|---|
| EP | 1 003 066 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |

(Continued)

Primary Examiner—Robert H. Kim
Assistant Examiner—Mike Qi
(74) Attorney, Agent, or Firm—Morgan, Lewis & Bockius LLP

(57) ABSTRACT

A rubbing apparatus having a turning buffer for fabricating a liquid crystal display device is disclosed in the present invention. The turning buffer includes a first support having a first mother substrate mounted thereon, a first turning unit rotating the first support, a second support having a second mother substrate mounted thereon, and a second turning unit rotating the first support, wherein the first and second turning units are separated from one another.

9 Claims, 5 Drawing Sheets

U.S. PATENT DOCUMENTS

| | | |
|---|---|---|
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,736,869 B1 * | 5/2004 | Agarwal et al. ............... 51/298 |
| 2001/0021000 A1 | 9/2001 | Egami |
| 2003/0147039 A1 * | 8/2003 | Lee et al. .................... 349/187 |

FOREIGN PATENT DOCUMENTS

| | | |
|---|---|---|
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-152211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 | 6/2000 |

* cited by examiner

RUBBING APPARATUS HAVING TURNING BUFFER FOR FABRICATING LIQUID CRYSTAL DISPLAY DEVICE

This application claims the benefit of the Korean Patent Application No. P2002-015968 filed on Mar. 25, 2002, which is hereby incorporated by reference.

BACKGROUND OF THE INVENTION

1. Field of the Invention

The present invention relates to an apparatus for fabricating a liquid crystal display device, and more particularly, to a rubbing apparatus having a turning buffer for fabricating a liquid crystal display device.

2. Discussion of the Related Art

A liquid crystal display device includes a thin film transistor array substrate, a color filter substrate bonded to the thin film transistor array substrate to have a uniform cell gap, and a liquid crystal layer inserted in the cell gap between the thin film transistor array substrate and the color filter substrate.

Pixels are arranged in a matrix form on the thin film transistor array substrate. A thin film transistor (TFT), a pixel electrode, and a capacitor are formed in a unit pixel. And, a common electrode, an RGB color filter, and a black matrix are patterned on the surface of the color filter substrate.

Meanwhile, alignment layers are formed on the surfaces of the thin film transistor array and the color filter substrates facing into each other. And, rubbing is carried out on the alignment layers to align liquid crystals in a predetermined direction. In this case, when an electric field is applied between the pixel electrode on each unit pixel of the thin film transistor array substrate and the common electrode on the entire surface of the color filter substrate, the liquid crystals are rotated by dielectric anisotropy to transmit or cut off light by each unit pixel for displaying a character or an image.

A method of fabricating a liquid crystal display device will be briefly explained as follows.

Thin film transistor array substrates are prepared on a first mother substrate, and color filter substrates are prepared on a second mother substrate.

As mentioned in the foregoing explanation, pixels are arranged in a matrix form on each of the thin film transistor array substrates. A thin film transistor, a pixel electrode, and a capacitor are formed in the unit pixel. A common electrode, a color filter, and a black matrix are patterned on each of the color filter substrates.

Subsequently, alignment layers are formed on each surface of the first and second mother substrates. Rubbing is then carried out on the alignment layers. In this case, a rubbing cloth is used to rub the surface of each of the alignment layers at an equal force and speed in order to align polymer chains on the surface of the corresponding alignment layer in a predetermined direction for aligning liquid crystals.

And, the first and second mother substrates are bonded to each other so that the alignment layers on the surfaces of the first and second mother substrates face into each other. In this case, spacers are inserted between the first and second mother substrates to provide a uniform cell gap between the bonded first and second mother substrates.

Thereafter, liquid crystal display panels formed on the bonded first and second mother substrates are cut individually to separate into a plurality of unit liquid crystal display panels.

FIG. 1 illustrates a schematic perspective view illustrating rubbing directions of alignment layers on first and second mother substrates according to a related art.

As shown in FIG. 1, a rubbing direction 12 of the alignment layer on the surface of a first mother substrate 10 lies from an upper left corner to a lower right corner of the first mother substrate 10, while a rubbing direction 22 of the alignment layer on the surface of a second mother substrate 20 lies from a lower left corner to an upper right corner of the second mother substrate 20.

FIG. 2 illustrates a schematic perspective view illustrating the rubbing directions 12 and 22 shown in FIG. 1 where the first and second mother substrates 10 and 20 are bonded to each other to have the alignment layers 11 and 21 facing into each other.

FIG. 3 illustrates a schematic perspective view carrying out rubbing on the alignment layer 11 on the surface of the first mother substrate 10 according to the related art.

As shown in FIG. 3, while the first mother substrate 10 moves in a direction in parallel with a longer side of the first mother substrate 10, a roller 14 covered with a rubbing cloth 13 is installed to be tilted at a predetermined angle θ with respect to the longer side of the first mother substrate 10 and is rubbed on the alignment layer 11 to carry out a rubbing process.

Hence, after the rubbing is carried out on each of the alignment layers 11 and 21 of the first and second mother substrates 10 and 20, the first or second mother substrate 10 or 20 needs to be rotated by 180° for bonding.

FIG. 4 illustrates a block diagram of a related art rubbing apparatus for fabricating a liquid crystal display panel.

Referring to FIG. 4, the related art rubbing apparatus for fabricating a liquid crystal display panel includes first and second alignment layer forming units 1 and 2 for forming alignment layers on the corresponding surfaces of first and second mother substrates, first and second rubbing units 3 and 4 rubbing the alignment layers respectively formed on the surfaces of the first and second mother substrates, and a single body type turning buffer 8 receiving the first and second mother substrates from the first and second alignment layer forming units 1 and 2 through a first conveying unit 5 to transfer the mother substrates to the first and second rubbing units 3 and 4 through a second conveying unit 6 and receiving the first and second mother substrates rubbed by the first and second rubbing units 3 and 4 through the second conveying unit 6 to be sequentially rotated to be put into a cassette 7 through the first conveying unit 5.

FIG. 5 illustrates a perspective view of a single body type turning buffer according to the related art.

Referring to FIG. 5, the single body type turning buffer according to the related art includes a first support 32 having first tabs 31 regularly separated from one another to mount a first mother substrate thereon, a second support 42 having second tabs 41 regularly separated from one another to mount a second mother substrate thereon, and a turning unit 45 connected to the corresponding ends of the first and second supports 32 and 42 to rotate the first and second supports 32 and 42 at the same time.

The related art rubbing apparatus having a turning buffer for fabricating the liquid crystal display device is explained in detail with reference to FIGS. 4 and 5 as follows.

The first and second mother substrates having the alignment layers formed thereon by the first and second alignment layer forming units 1 and 2 are mounted on the corresponding first and second supports 32 and 42 of the single body type turning buffer 8 by the first conveying unit 5.

Subsequently, the first and second mother substrates mounted on the first and second supports 32 and 42 of the single body type turning buffer 8 are transferred to the first and second rubbing units 3 and 4 by the second conveying unit 6 to carry out the rubbing process thereon.

Then, the first and second mother substrates with the completed rubbing process by the first and second rubbing units 3 and 4 are mounted on the first and second supports 32 and 42 of the single body type turning buffer 8 by the second conveying unit 6, respectively.

Thereafter, the first and second mother substrates mounted on the first and second supports 32 and 42 of the single body type turning buffer 8 are simultaneously rotated by the turning unit 45 of the single body type turning buffer 8 and are then alternately transferred to the cassette 7 by the first conveying unit 5. Meanwhile, the cassette receiving the first and second mother substrates in the receiving space is transferred to other equipments carrying out a subsequent process.

As mentioned in the foregoing explanation, one of the rubbed first and second mother substrates should be rotated by 180° prior to bonding to the other rubbed mother substrate.

Hence, once the rubbed first and second mother substrates are mounted on the corresponding first and second supports 32 and 42 of the single body type turning buffer 8, the first and second supports 32 and 42 are rotated by 180°. One of the first and second mother substrates is then transferred to the cassette 7 through the first conveying unit 5. Subsequently, after the first and second supports 32 and 42 are rotated by 180° through the turning unit 45, the remaining mother substrate is transferred to the cassette 7 through the first conveying unit 5.

Thus, in the related art rubbing apparatus having the turning buffer for fabricating the liquid crystal display device including the single body type turning buffer, the first and second mother substrates are respectively transferred to the first and second rubbing units, and the rubbed first and second mother substrates are rotated at the same time to be alternately transferred to the cassette.

However, it takes a long time to transfer the rubbed first and second mother substrates to the cassette. Thus, a waiting time can be increased for the mother substrates to be transferred to the first and second rubbing units through the single body type turning buffer. Hence, productivity is reduced.

SUMMARY OF THE INVENTION

Accordingly, the present invention is directed to a rubbing apparatus having a turning buffer for fabricating a liquid crystal display device that substantially obviates one or more of problems due to limitations and disadvantages of the related art.

Another object of the present invention is to provide a rubbing apparatus having a turning buffer for fabricating a liquid crystal display device that enables to promptly transfer a mother substrate having an alignment layer to a rubbing unit as well as the rubbed mother substrate to a cassette.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a turning buffer for a liquid crystal display panel according to the present invention includes a first support having a first mother substrate mounted thereon, a first turning unit rotating the first support, a second support having a second mother substrate mounted thereon, and a second turning unit rotating the first support, wherein the first and second turning units are separated from one another.

In another aspect of the present invention, a rubbing apparatus for fabricating a liquid crystal display panel includes first and second alignment layer forming units forming first and second alignment layers on surfaces of first and second mother substrates, first and second rubbing units rubbing the first and second alignment layers, and a separate body type turning buffer receiving the first and second mother substrates from the first and second alignment layer forming units through a first conveying unit to respectively transfer to the first and second rubbing units through a second conveying unit, wherein the separate body type turning buffer receives the first and second mother substrates rubbed by the first and second rubbing units through the second conveying unit to put the rubbed first and second mother substrates into a cassette simultaneously through the first conveying unit by rotating the rubbed first and second mother substrates independently.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
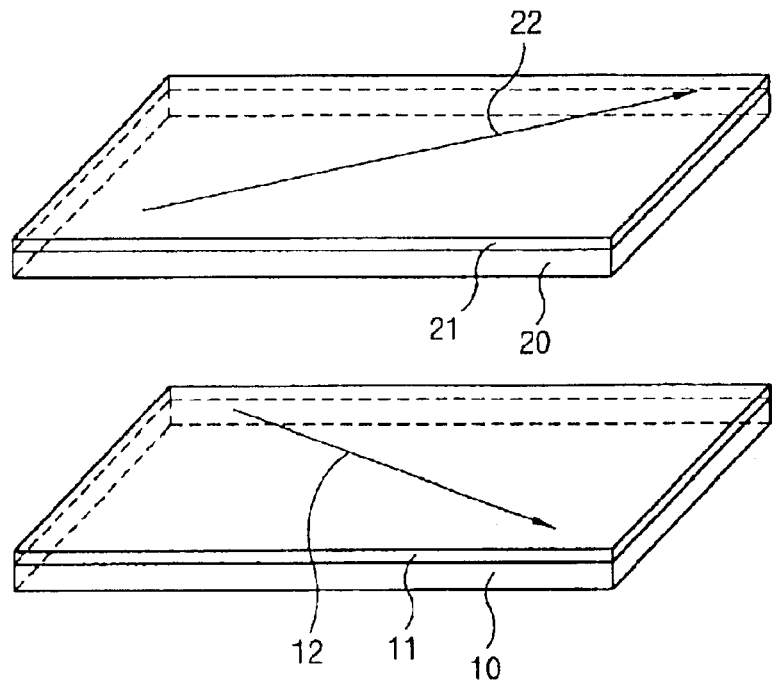
FIG. 1 illustrates a schematic perspective view illustrating rubbing directions of alignment layers on first and second mother substrates according to a related art.
Figure 2:
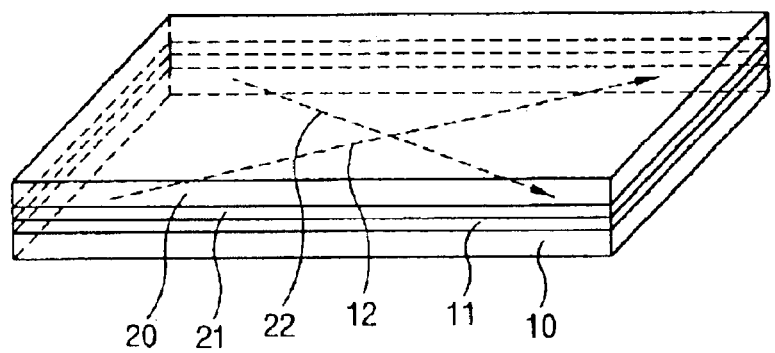
FIG. 2 illustrates a schematic perspective view illustrating the rubbing directions in FIG. 1 where the first and second mother substrates are bonded to each other to have the alignment layers facing into each other.
Figure 3:
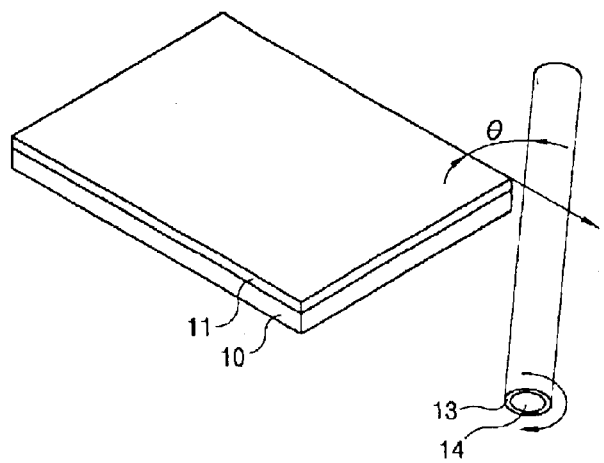
FIG. 3 illustrates a schematic perspective view carrying out rubbing on the alignment layer on the surface of the first mother substrate according to the related art.
Figure 4:
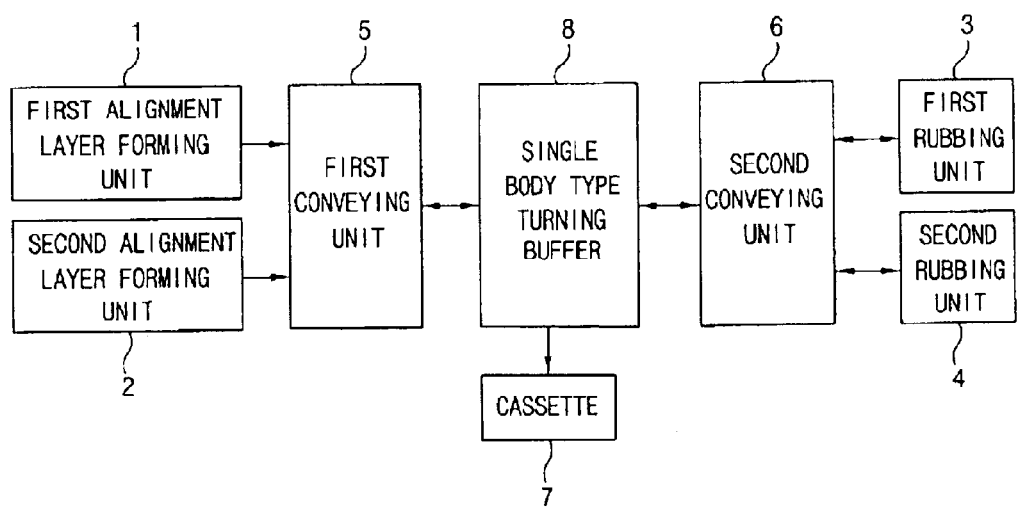
FIG. 4 illustrates a block diagram of a related art rubbing apparatus for fabricating a liquid crystal display panel.
Figure 5:
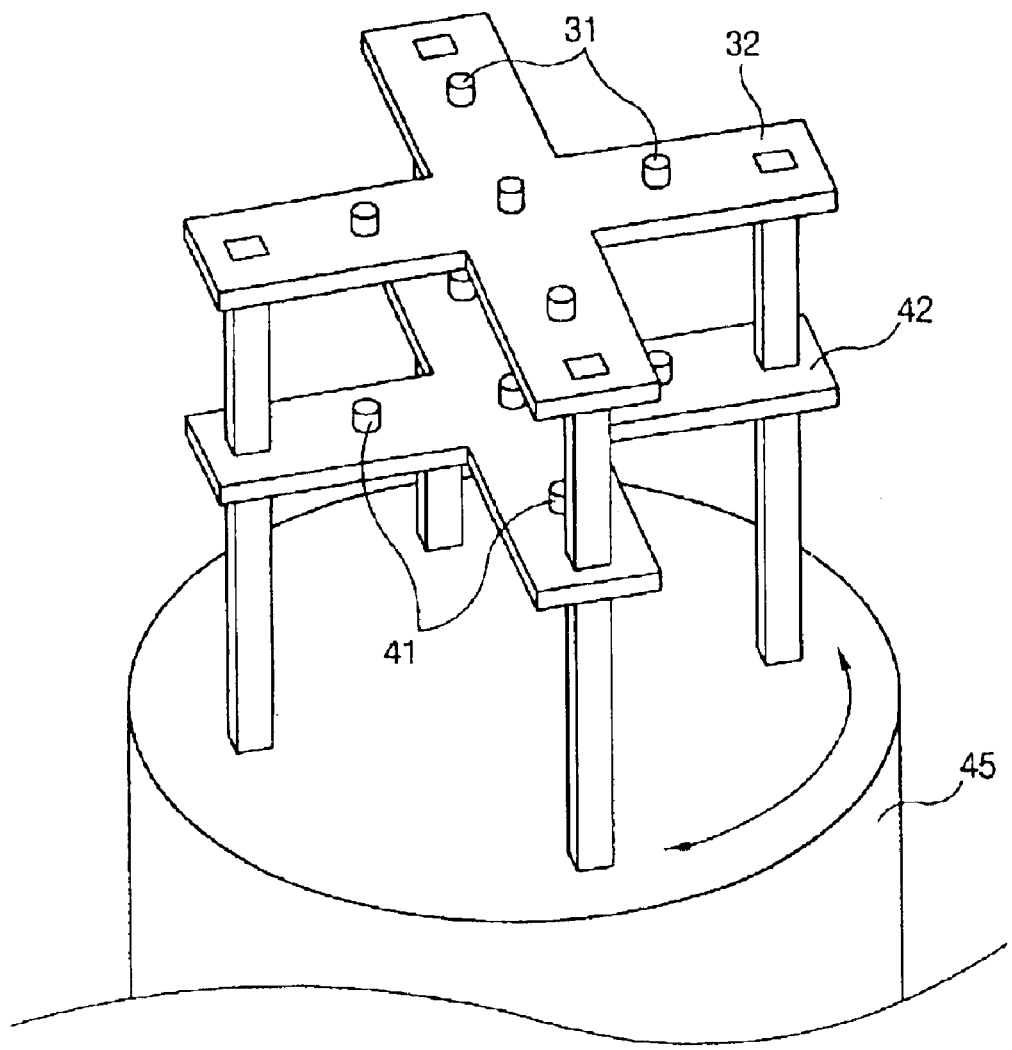
FIG. 5 illustrates a perspective view of a single body type turning buffer according to the related art.
Figure 6:
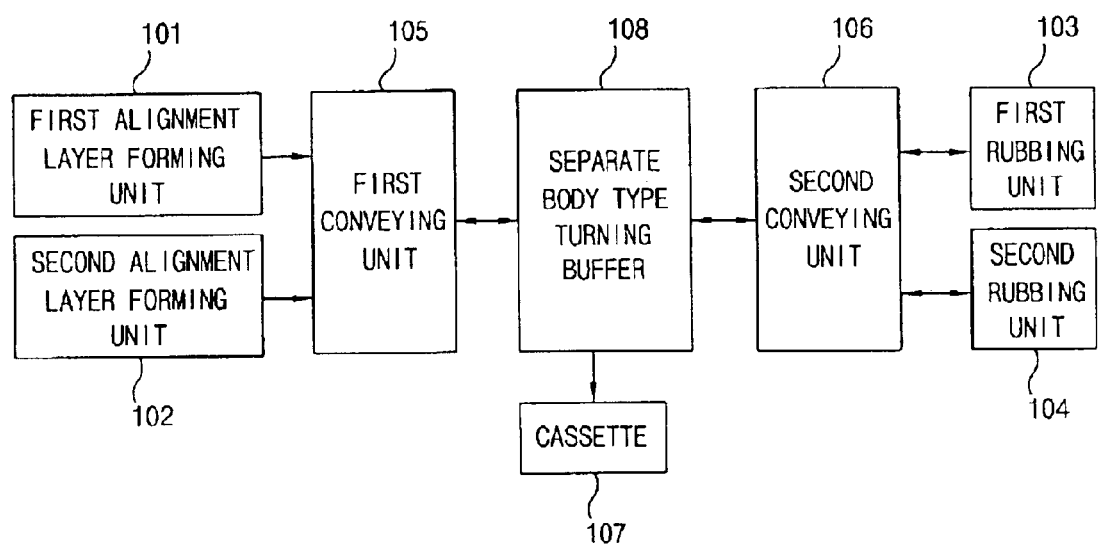
FIG. 6 illustrates a block diagram of a rubbing apparatus for a liquid crystal display panel according to the present invention.

FIG. 6 illustrates a block diagram of a rubbing apparatus for a liquid crystal display panel according to the present invention.

As shown in FIG. 6, the rubbing apparatus for a liquid crystal display panel according to the present invention includes first and second alignment layer forming units 101 and 102 forming corresponding alignment layers on the surfaces of first and second mother substrates, first and second rubbing units 103 and 104 rubbing the alignment layers respectively formed on the surfaces of the first and second mother substrates, and a separate body type turning buffer 108 receiving the first and second mother substrates from the first and second alignment layer forming units 101 and 102 through a first conveying unit 105 to respectively transfer the mother substrates to the first and second rubbing units 103 and 104 through a second conveying unit 106 and receiving the first and second mother substrates rubbed by the first and second rubbing units 103 and 104 through the second conveying unit 106 to simultaneously put the rubbed first and second mother substrates into a cassette 107 through the first conveying unit 105 by independently rotating the rubbed first and second mother substrates.

Figure 7:
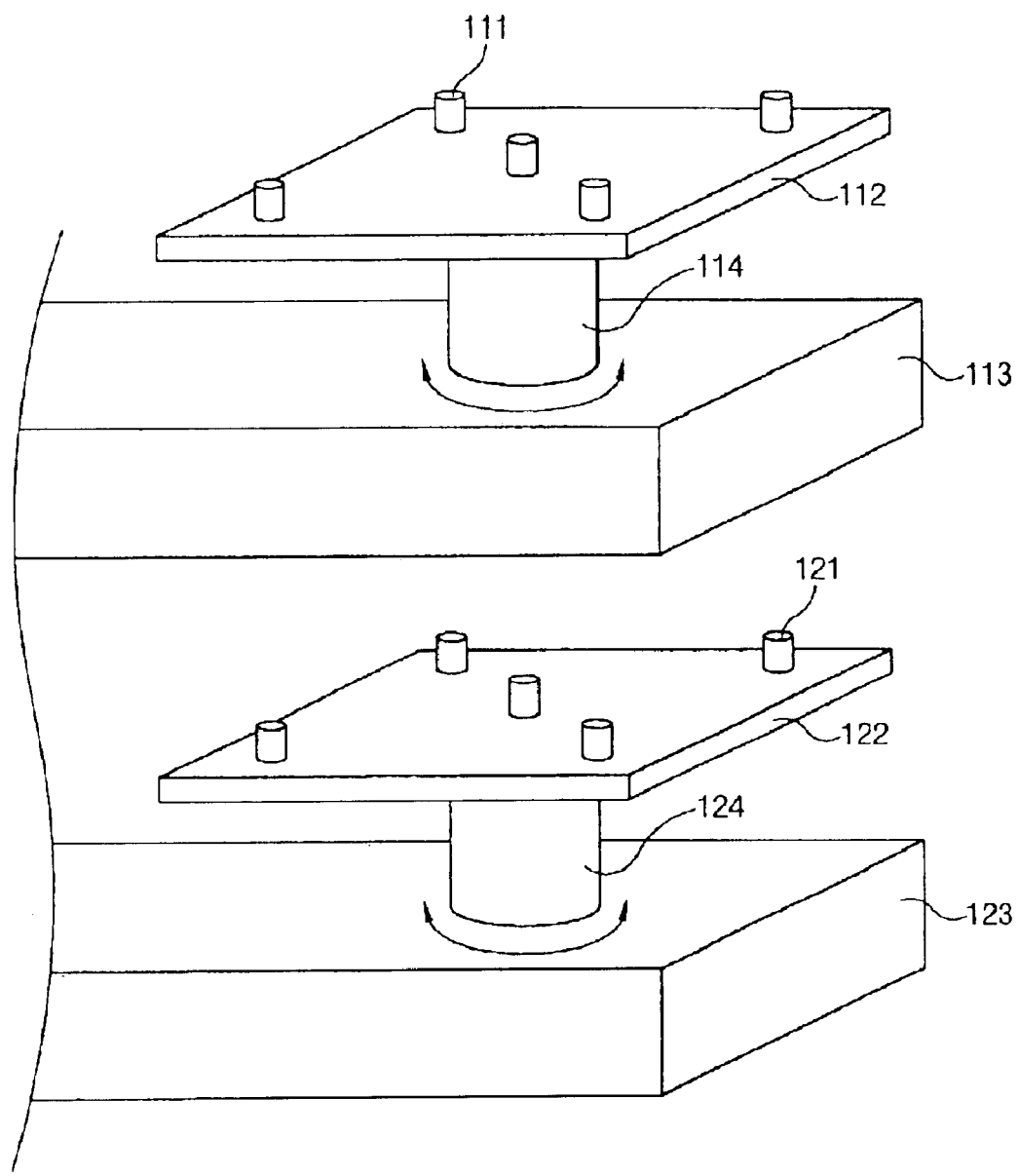
FIG. 7 illustrates a perspective view of a separate body type turning buffer of FIG. 6.

FIG. 7 illustrates a perspective view of a separate body type turning buffer of FIG. 6.

As shown in FIG. 7, a separate body type turning buffer according to the present invention includes a first support 112 having a plurality of first tabs 111 regularly separated from one another to mount a first mother substrate thereon, a first turning unit 114 on a first table 113 to rotate the first support 112, a second support 122 having a plurality of second tabs 121 regularly separated from one another to mount a second mother substrate thereon, and a second turning unit 124 on a second table 123 to turn the second support 122.

The rubbing apparatus having the turning buffer for fabricating the liquid crystal display device according to the present invention is explained in detail with reference to FIGS. 6 and 7 as follows.

The first and second mother substrates having the alignment layers formed thereon by the first and second alignment layer forming units 101 and 102 are transferred to be mounted on the first and second supports 112 and 122 of the separate body type turning buffer 108 by the first conveying unit 105, respectively.

The first mother substrate includes a wide glass substrate having a plurality of thin film transistor array substrates of unit liquid crystal display panels. The second mother substrate includes a wide glass substrate having a plurality of color filters of the unit liquid crystal display panels. Alternatively, the color filter substrates may be formed on the first mother substrate, and the thin film transistor array substrates may be formed on the second mother substrate.

Subsequently, the first and second mother substrates mounted on the first and second supports 112 and 122 of the separate body type turning buffer 108 are transferred to the first and second rubbing units 103 and 104 by the second conveying unit 106 to carry out rubbing thereon.

Then, the first and second mother substrates with the completed rubbing process by the first and second rubbing units 103 and 104 are mounted on the first and second supports 112 and 122 of the separate body type turning buffer 108 by the second conveying unit 106, respectively.

Thereafter, after one of the first and second mother substrates mounted on the first and second supports 112 and 122 of the separate body type turning buffer 108 is rotated by the first or second turning unit 114 or 124 of the separate body type turning buffer 108, the first and second mother substrates are simultaneously transferred to the cassette 107 by the first conveying unit 105. Meanwhile, the cassette receiving the first and second mother substrates in the receiving space is transferred to other equipments to carry out a subsequent process.

As mentioned in the foregoing explanation, one of the rubbed first and second mother substrates should be rotated by 180° prior to bonding to the other rubbed mother substrate.

Hence, once the rubbed first and second mother substrates are mounted on the first and second supports 112 and 122 of the separate body type turning buffer 108, respectively, the first or second support 112 or 122 is rotated by 180° by the first or second turning unit 114 or 124. The first and second mother substrates are then transferred to the cassette 107 through the first conveying unit 105 at the same time.

Thus, in the rubbing apparatus having the turning buffer for fabricating the liquid crystal display device according to the present invention including the separate body type turning buffer, the first and second mother substrates having the alignment layers are transferred to the corresponding first and second rubbing units, and one of the rubbed first and second mother substrates is rotated to simultaneously transfer both of the rubbed first and second mother substrates to the cassette.

Accordingly, the processing time taken to transfer the rubbed first and second mother substrates to the cassette is minimized, thereby preventing another set of first and second mother substrates from waiting to be transferred to the first and second rubbing units through the separate body type turning buffer. Therefore, the present invention improves productivity.

It will be apparent to those skilled in the art that various modifications and variations can be made in the rubbing apparatus having the turning buffer for fabricating the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A turning buffer for a liquid crystal display panel, comprising:
   a first support having a first mother substrate mounted thereon;
   a first turning unit driving the first support to rotate the first mother substrate;
   a second support having a second mother substrate mounted thereon; and
   a second turning unit driving the second support to rotate the second mother substrate, wherein the first and second supports are separated from each other and the first mother substrate is separated from the second mother substrate.

2. The turning buffer of claim 1, wherein each of the first and second supports comprises a plurality of tabs protruding from a surface of each of the first and second supports and are separated apart from one another.

3. The turning buffer of claim 1, wherein the first and second turning units are operated independently.

4. The turning buffer of claim 1, wherein the first and second turning units rotate the first and second supports by 180°.

5. A rubbing apparatus for fabricating a liquid crystal display panel, comprising:
  first and second alignment layer forming units forming first and second alignment layers on surfaces of first and second mother substrates;
  first and second rubbing units rubbing the first and second alignment layers; and
  a separate body type turning buffer receiving the first and second mother substrates from the first and second alignment layer forming units through a first conveying unit to respectively transfer to the first and second rubbing units through a second conveying unit, wherein the separate body type turning buffer receives the first and second mother substrates rubbed by the first and second rubbing units through the second conveying unit to put the rubbed first and second mother substrates into a cassette simultaneously through the first conveying unit by rotating the rubbed first and second mother substrates independently.

6. The rubbing apparatus of claim 5, wherein the separate body type turning buffer includes:
  a first support having a first mother substrate mounted thereon;
  a first turning unit rotating the first support;
  a second support having a second mother substrate mounted thereon; and
  a second turning unit rotating the second support, wherein the first and second turning units are separated from one another.

7. The rubbing apparatus of claim 5, wherein each of the first and second supports comprises a plurality of tabs protruding from a surface of each of the first and second supports and are separated apart from one another.

8. The rubbing apparatus of claim 5, wherein the first and second turning units are operated independently.

9. The rubbing apparatus of claim 5, wherein the first and second turning units rotate the first and second supports by 180°.

* * * * *